United States Patent
Chen et al.

(10) Patent No.: US 11,442,464 B2
(45) Date of Patent: Sep. 13, 2022

(54) BIRD'S EYE VIEW MAP BASED RECOGNITION AND MOTION PREDICTION FOR AUTONOMOUS SYSTEMS

(71) Applicant: Mitsubishi Electric Research Laboratories, Inc., Cambridge, MA (US)

(72) Inventors: Siheng Chen, Cambridge, MA (US); Pengxiang Wu, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 344 days.

(21) Appl. No.: 16/829,045

(22) Filed: Mar. 25, 2020

(65) Prior Publication Data
US 2021/0302992 A1    Sep. 30, 2021

(51) Int. Cl.
  *G05D 1/02*   (2020.01)
  *G06T 7/70*   (2017.01)
  *B60W 60/00*  (2020.01)
  *G05D 1/00*   (2006.01)
  *G06N 3/08*   (2006.01)

(52) U.S. Cl.
  CPC ....... *G05D 1/0251* (2013.01); *B60W 60/0027* (2020.02); *G05D 1/0088* (2013.01); *G06N 3/08* (2013.01); *G06T 7/70* (2017.01); *B60W 2420/42* (2013.01); *B60W 2420/52* (2013.01); *G06T 2207/20081* (2013.01); *G06T 2207/20084* (2013.01); *G06T 2207/30241* (2013.01)

(58) Field of Classification Search
  CPC ...... G06N 3/0454; G06V 20/20; G06V 20/58; G06V 10/82; B60W 60/00276; G01S 17/42; G05D 1/0221; H04N 7/18; B60R 1/00

See application file for complete search history.

(56) References Cited

U.S. PATENT DOCUMENTS

| | | | |
|---|---|---|---|
| 2014/0085472 A1* | 3/2014 | Lu | B60R 1/00 348/148 |
| 2019/0052842 A1* | 2/2019 | Du | H04N 7/18 |
| 2019/0113927 A1* | 4/2019 | England | G05D 1/0221 |
| 2019/0294869 A1* | 9/2019 | Naphade | G06V 10/82 |
| 2019/0383945 A1* | 12/2019 | Wang | G01S 17/42 |
| 2020/0082185 A1* | 3/2020 | Yamamoto | G06V 20/58 |
| 2020/0207375 A1* | 7/2020 | Mehta | B60W 60/00276 |
| 2020/0218910 A1* | 7/2020 | Herman | G06V 20/20 |

* cited by examiner

Primary Examiner — Yuri Kan
(74) Attorney, Agent, or Firm — Gennadiy Vinokur; Hironori Tsukamoto

(57) ABSTRACT

A control system for controlling a motion of a vehicle is disclosed, where the control system comprises an input interface to accept measurements of the environment and an image processor to generate an extended bird's eye view (BEV) image from the measurements. The BEV image has a set of pixels carrying information about objects in the environment, and a pixel in the set of pixels is associated with a time sequence of future positions of the pixel in subsequent time steps representing a prediction of a future motion of an object. The control system further comprises a motion planner to produce a motion trajectory of the vehicle using the extended BEV image. The control system further comprises a controller to control an actuator of the vehicle based on the produced motion trajectory.

14 Claims, 14 Drawing Sheets

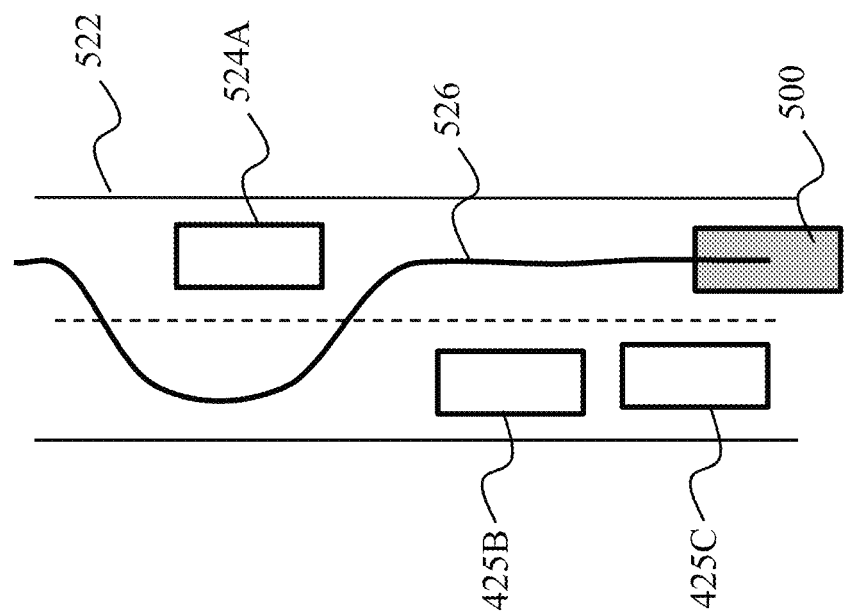

BIRD'S EYE VIEW MAP BASED RECOGNITION AND MOTION PREDICTION FOR AUTONOMOUS SYSTEMS

TECHNICAL FIELD

This invention relates generally to image processing, and more specifically to predicting motion for autonomous systems based on image data.

BACKGROUND

Determining environmental states is critical for deploying autonomous systems such as autonomous vehicles (AVs), and accurate state information facilitates motion planning for smooth user experience. The estimation of the environmental state typically comprises two tasks: (1) perception, which identifies the foreground objects from the background; and (2) motion prediction, which predicts future trajectories of objects. Various methods have been developed to handle these two tasks independently as well as jointly, achieving progress with the aid of deep learning.

Conventional approaches to the perception of environment mainly rely on the bounding box detection, which is implemented through two-dimensional (2D) object detection based on camera data, three-dimensional (3D) object detection based on light detection and ranging (LiDAR) data, or fusion-based detection. The detected bounding boxes are then fed into an object tracker, followed by a motion predictor. Some recent works implement all these modules into an end-to-end framework (also called as a pipeline), which directly produces bounding boxes along with future trajectories. While being widely adopted, the above state estimation strategies (i.e., bounding box pipeline) tend to fail in open-set scenarios of real traffic due to the dependency on object detection. In particular, the object detectors are difficult to generalize to classes that have never been present in the training set, consequently leading to catastrophic failures for the downstream modules.

Many solutions have been utilized to overcome such undesirable effects. One solution to the above-stated problem is to represent 3D environmental information by using an occupancy grid map (OGM). The OGM discretizes the 3D point cloud into equal 2D grid cells, each of which contains the belief that the corresponding space is occupied by at least one point. With this design, an OGM pipeline can be utilized to specify a future drivable space and thereby provide support for motion planning. However, one major shortcoming of the OGM is the difficulty to model the dynamics of objects.

Accordingly, there is a need to develop a system for extending OGM representation to modeling dynamics of the objects.

SUMMARY

It is an object of some embodiments to determine to control motion of a vehicle in the environment. Additionally, or alternatively, it is an object of some embodiments to determine the position of the one or more objects in the environment to control the motion of the vehicle. Additionally, or alternatively, it is an object of some embodiments to determine motion of the one or more objects on the environment to control the motion of the vehicle.

Some embodiments are based on a recognition of shortcomings in the current bounding-box detection pipeline and the OGM-based pipeline. In order to overcome these shortcomings, the environmental state is detected based on a bird's eye view (BEV) map of the environment in which the one or more objects are present. The BEV map is an elevated view of an object from above, with a perspective as though an observer were a bird. To generate the BEV map, a point cloud associated with the environment is discretised around a vehicle (e.g., an ego-vehicle) in the environment into independent cells, e.g., pixels of a BEV map.

The BEV map of some embodiments extends the OGM and provides three-fold information including occupancy, motion, and classification information associated with the one or more objects in the environment. The motion information is encoded by associating each cell with displacement vectors, which represent the positions into the future and characterize nonlinear dynamics. In this way, a drivable space for the vehicle is determined as well as the motion behaviour of each individual object is described.

In some embodiments, a cell classification corresponding to each object is determined to facilitate understanding of the environment. To that end, a deep model in accordance with a temporal sequence of BEV maps is generated, where the deep model executes joint reasoning about the category and motion information for each cell in an end-to-end manner.

In some embodiments, the extended BEV image includes an occupancy grid map (OGM) with additional info including pixel classification and motion. The OGM is advantageous for instantaneous motion planning, while the additional motion extends the OGM in time for future motion planning. In addition, the pixel classification is more flexible than the bounding box detection by allowing classification of the pixels as a foreground object, while object detection needs to know type of the object beforehand.

Some embodiments are based on a realization that a BEV-image-based method is potentially easier to capture unseen objects than the bounding-box-detection-based methods. In the bounding-box-detection-based methods objects are captured using global shape/texture information in a region of interest (ROI), which is different across object categories and is difficult to generalize from seen objects to unseen objects. In contrast, the BEV-image-based method effectively decomposes the ROI into grid cells, and in each cell it extracts local information shared by many object categories In such a manner, some embodiments avoid motion planning based on bounding box object detection, because the bounding box detection can be disadvantageous for dynamic situation of vehicle control. For example, in some case, objects fail to be detected, and even if a pedestrian can be detected, the motion of the pedestrian can shift the detected bounding box and/or make it jitter over time step. Accordingly, a quality of motion prediction of the objects is reduced. Additionally, or alternatively, the extended BEV image can supplement motion planning based on bounding box object detection.

Some embodiments determine the extended BEV image using a multi-head neural network including a feature extraction network connected to three heads such as a cell classification head, a motion prediction head, and a current motion state estimation head. These three heads of the multi-head neural network provide outputs for generating the extended BEV image as well as enabling a feature extraction network to enable indirect information exchange between the three heads. The entire multi-head neural network is trained in an end-to-end manner Therefore, the feature extraction network and the three heads are mutually dependent such that the information is exchanged between the three heads.

For example, because the multi-head neural network outputs results of three heads, the training of the multi-head neural network indirectly produces features that are beneficial for all three heads. Hence, at least indirectly, the motion prediction head receives information useful for classification, motion state estimation and vice versa. In such a manner, the results of the motion prediction consider the classification and motion state estimation, at least indirectly.

In other words, by producing different outputs, the multi-head neural network is trained to consider each output, referred herein as mutual promotion. Additionally, or alternatively, post processing of the outputs of different heads of multi-head neural network further refines the extended BEV image. For example, the motion of background and static objects identified by the cell classification and the current motion state estimation heads can be reduced to zero.

Some embodiments are based on an objective of providing a system (i.e., MotionNet) that is able to predict motions, even for unseen objects in the training set. The MotionNet is bounding-box free, and is able to leverage motion clues for object recognition. The MotionNet includes a spatio-temporal pyramid network (STPN) that extracts spatio-temporal features of the objects.

To that end, the STPN executes a series of spatio-temporal convolutions (STC) in a hierarchical fashion. Each STC relies on 2D spatial convolutions, followed by a light-weight pseudo-one dimensional (1D) temporal convolution, yielding an efficient system. The outputs of the STPN are delivered to different heads for cell classification, state estimation and motion prediction, respectively. During inference, to make the predictions consistent across tasks, the predicted motions are regularized with a guide of classification results. The MotionNet system includes three parts: (1) data representation from raw 3D point clouds to BEV maps; (2) spatio-temporal pyramid network as a backbone; and (3) task-specific heads for grid cell classification and motion prediction.

Some embodiments are based on an object of controlling actuators of the vehicle based on the motion of the objects predicted by the system (e.g., the MotionNet). Towards that end, the outputs of the three heads are provided to a motion planner. The motion planner generates a motion trajectory based on the output of the three heads. The vehicle receives the motion trajectory and controls the motion of the vehicle based on the motion trajectory such that the vehicle is driven without any obstacles.

Accordingly, one embodiment discloses a control system for controlling a motion of a vehicle, comprising an input interface configured to accept measurements of the environment; a memory configured to store a multi-head neural network including a feature extraction network connected to a cell classification head, a motion prediction head, and a current motion state estimation head; an image processor configured to submit the measurements to the multi-head neural network; and generate, via the multi-head neural network, an extended bird's eye view (BEV) image having a set of pixels carrying an information about objects in the environment based on the measurements, wherein a pixel in the set of pixels is classified with a label of an object occupying a location corresponding to a position of the pixel in the extended BEV image at a current time step, and wherein the pixel is associated with a time sequence of future positions of the pixel in subsequent time steps representing a prediction of a future motion of the object; and a motion planner configured to produce a motion trajectory of a vehicle using the extended BEV image; and a controller configured to control an actuator of the vehicle based on the motion trajectory.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5C illustrates a schematic of a motion trajectory for the vehicle, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
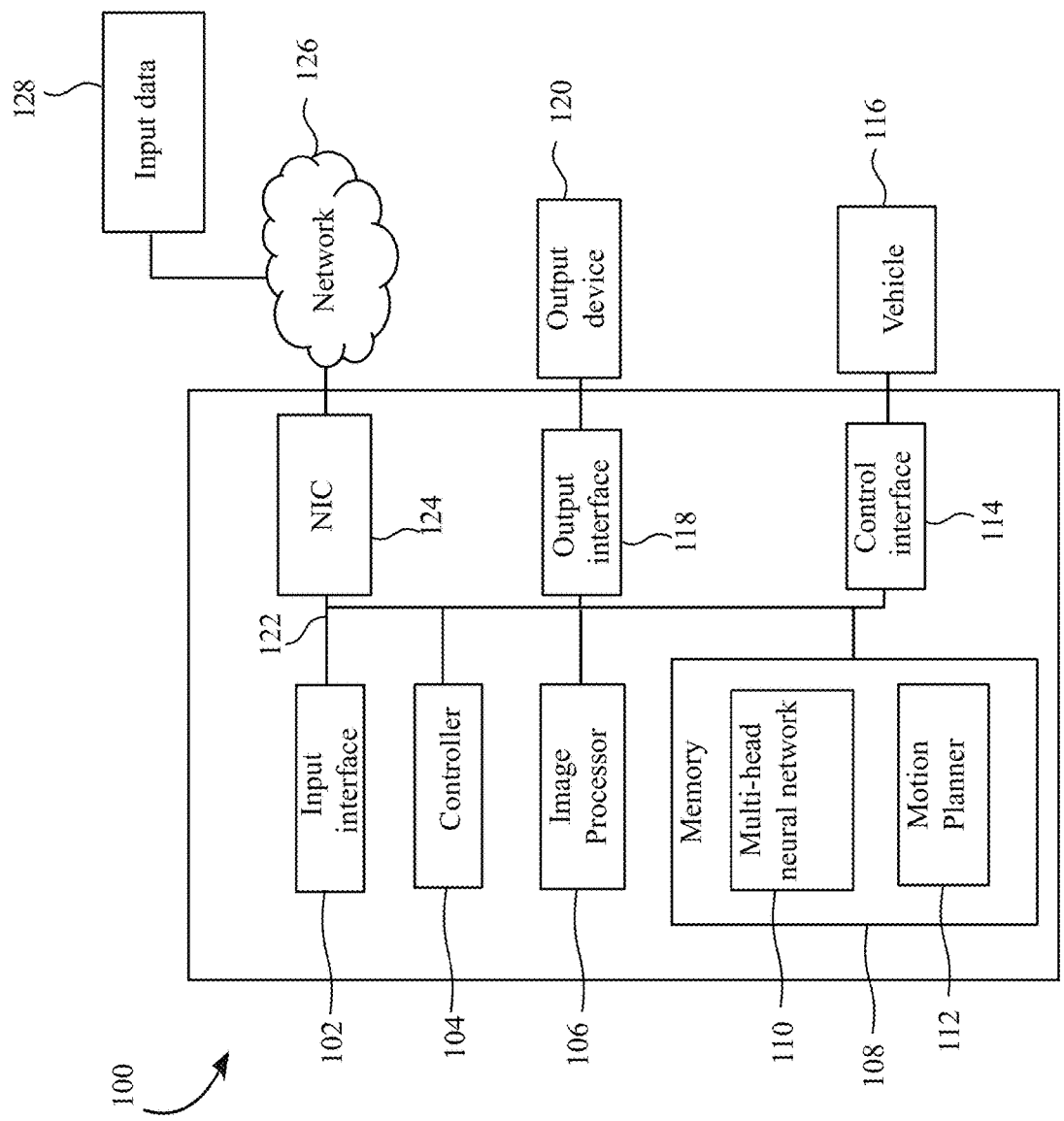
FIG. 1 illustrates a block diagram of a control system for controlling a motion of a vehicle, according to some embodiments.

FIG. 1 illustrates a control system 100 for controlling a motion of a vehicle 116, according to some embodiments.

The control system 100 includes an input interface 102 configured to accept input data from an external device (not shown), for controlling the vehicle 116. The vehicle 116 may be an autonomous vehicle or a semi-autonomous vehicle. Further, the control system 100 includes a network interface controller (NIC) 124 adapted to connect the control system 100 through a bus 122 to a network 126. Through the network 126, either wirelessly or through wires, the control system 100 may receive the input data 128. The input data 128 may be measurements of an environment. In some embodiments, the measurements may be a sequence of 3D point cloud frames, where each of the 3D point cloud frames is associated with its corresponding local coordinate system.

Further, the control system 100 includes an image processor 106 configured to generate an extended bird's eye view (BEV) image based on the measurements (i.e., the input data 128) of the environment, where the extended BEV image has a set of pixels carrying an information about objects in the environment. A BEV image corresponds to a bird's eye view of an object that is an elevated view of the object from above, with a perspective as though an observer were a bird.

To generate the extended BEV image, the image processor 106 submits the measurements of the environment to a multi-head neural network 110. The multi-head neural network 110 includes a feature extraction network connected to three heads such as a cell classification head, a motion prediction head, and a current motion state estimation head. These three heads of the multi-head neural network 110 provide outputs that are utilized to generate the extended BEV image. The multi-head neural network 110 classifies each pixel in the set of pixels of the extended BEV image with a label of an object occupying a location corresponding to a position of the pixel in the extended BEV image at a current time step. Further, such a pixel is associated with a time sequence of future positions of the pixel in subsequent time steps representing a prediction of a future motion of the object. The image processor 106 determines the time sequence of future positions of at least some pixel based on the outputs from the motion prediction head.

Additionally, or alternatively, post processing of the outputs of the three heads of the multi-head neural network 110 further refines the extended BEV image. For example, motion of background and static objects identified by the cell classification head and the current motion state estimation head may be reduced to zero such that jitters are avoided during the prediction of motion of the object.

The control system 100 includes a memory 108 that stores instructions executable by a controller 104. The controller 104 may be configured to execute the stored instructions in order to control operations of the control system 100. The controller 104 may be a single core processor, a multi-core processor, a graphics processing unit (GPU), a computing cluster, or any number of other configurations. The memory 108 may include random access memory (RAM), read only memory (ROM), flash memory, or any other suitable memory systems. Further, the memory 108 stores the multi-head neural network 110, a motion planner 112, and the input data 128. The multi-head neural network 110 includes executable instructions for generating the extended BEV image.

Further, the motion planner 112 includes executable instructions for determining a motion profile providing high-level guidance commands such as a motion trajectory, position, velocity, heading, and the like of the vehicle 116 such that the vehicle 116 reaches at its destination while avoiding obstacles and minimizing a cost of traversal. In some embodiment, the motion planner 112 may be a motion planning network configured to execute neural-network based motion planning algorithms such as Rapidly-exploring Random Trees (RRT), optimal Rapidly-exploring Random Trees (RRT*), Potentially Guided-RRT* (P-RRT*), and the like, in order to generate the motion trajectory.

The motion trajectory is a path from a source point to a destination point, which the vehicle 116 traverses to reach at a destination. In some embodiments, the motion trajectory can be represented as one or combination of a sequence of Cartesian coordinates with a time associated to each coordinate, a sequence of positions and velocities of the vehicle 116, and a sequence of headings of the vehicle 116. To generate the motion trajectory, the motion planner 112 utilizes the output of the multi-head neural network 110. For instance, the motion planner 112 produces the motion trajectory of the vehicle 116 based on the extended BEV image.

In some implementations, the control system 100 is connected to a control interface 114 through the bus 122 adapted to connect the control system 100 to the vehicle 116 that is to be controlled based on inputs (e.g., the produced motion trajectory and the like) from the control system 100. Accordingly, the vehicle 116 is operatively coupled to the control system 100 in such a way that the vehicle 116 performs operations in accordance with the inputs received from the control system 100. For instance, the controller 104 controls an actuator of the vehicle 116 based on the produced motion trajectory. Thus, the control system 100 facilitates motion control to the vehicle 116 based on the produced motion trajectory.

Additionally, or alternatively, the control system 100 includes an output interface 118 configured to output the produced motion trajectory. The output interface 118 is adapted to connect the control system 100 to an output device 120 via the network 126. The output device 120 may be a display device, a transmitter, and the like that outputs the produced motion trajectory to a device or a vehicle (e.g., the vehicle 116).

Figure 2A:
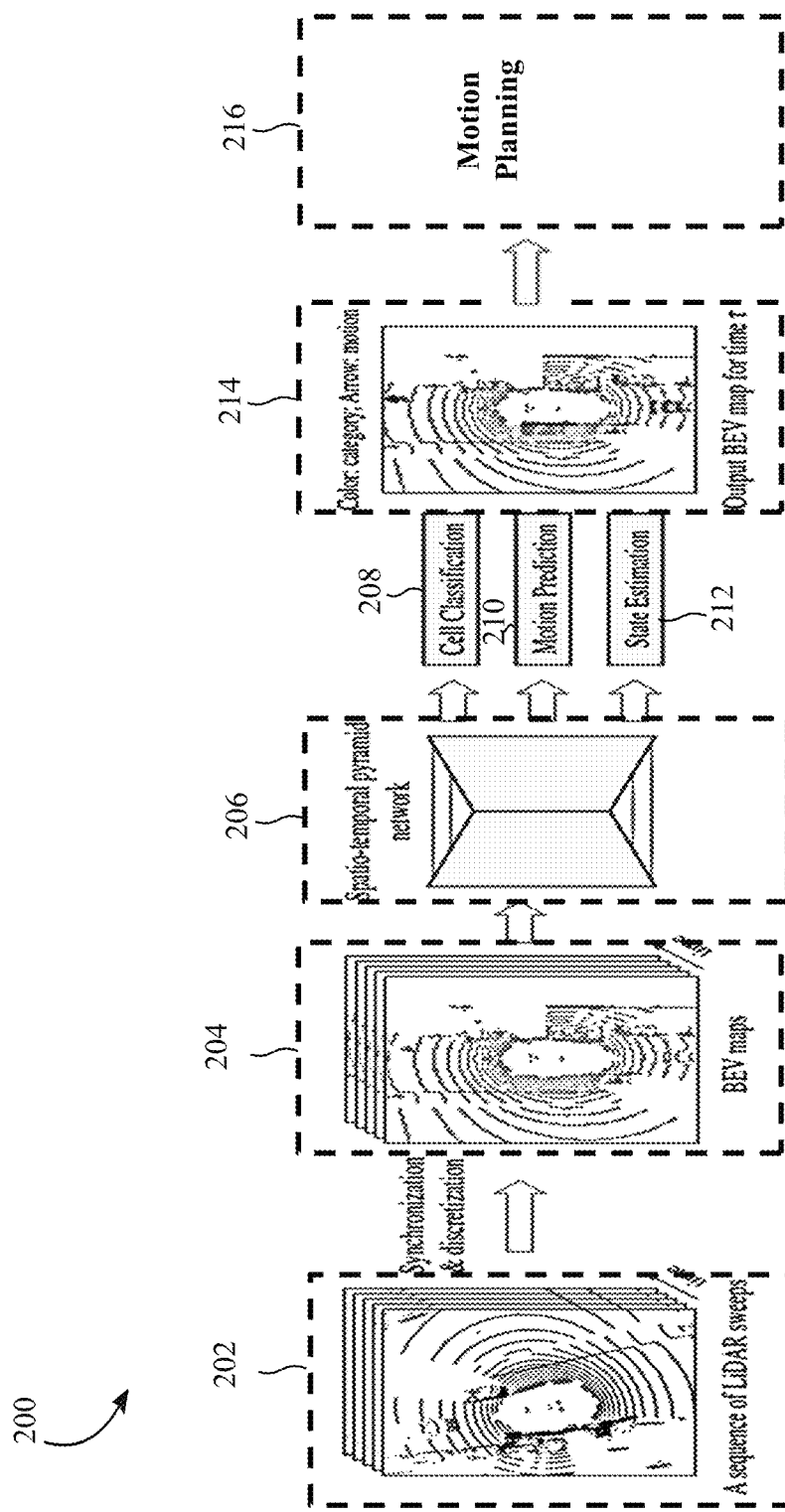
FIG. 2A illustrates a schematic of a processing pipeline for the control system, according to some embodiments.

FIG. 2A illustrates a schematic for processing pipeline 200 for the control system 100, according to some embodiments. In FIG. 2A, there is shown a set of operations 202-216 which are performed in the control system 100 to control the vehicle 116. The operations 202-214, collectively, may correspond to a MotionNet system that outputs extended BEV maps in accordance with a class, a state, and a motion of each object in an environment.

Figure 2B:
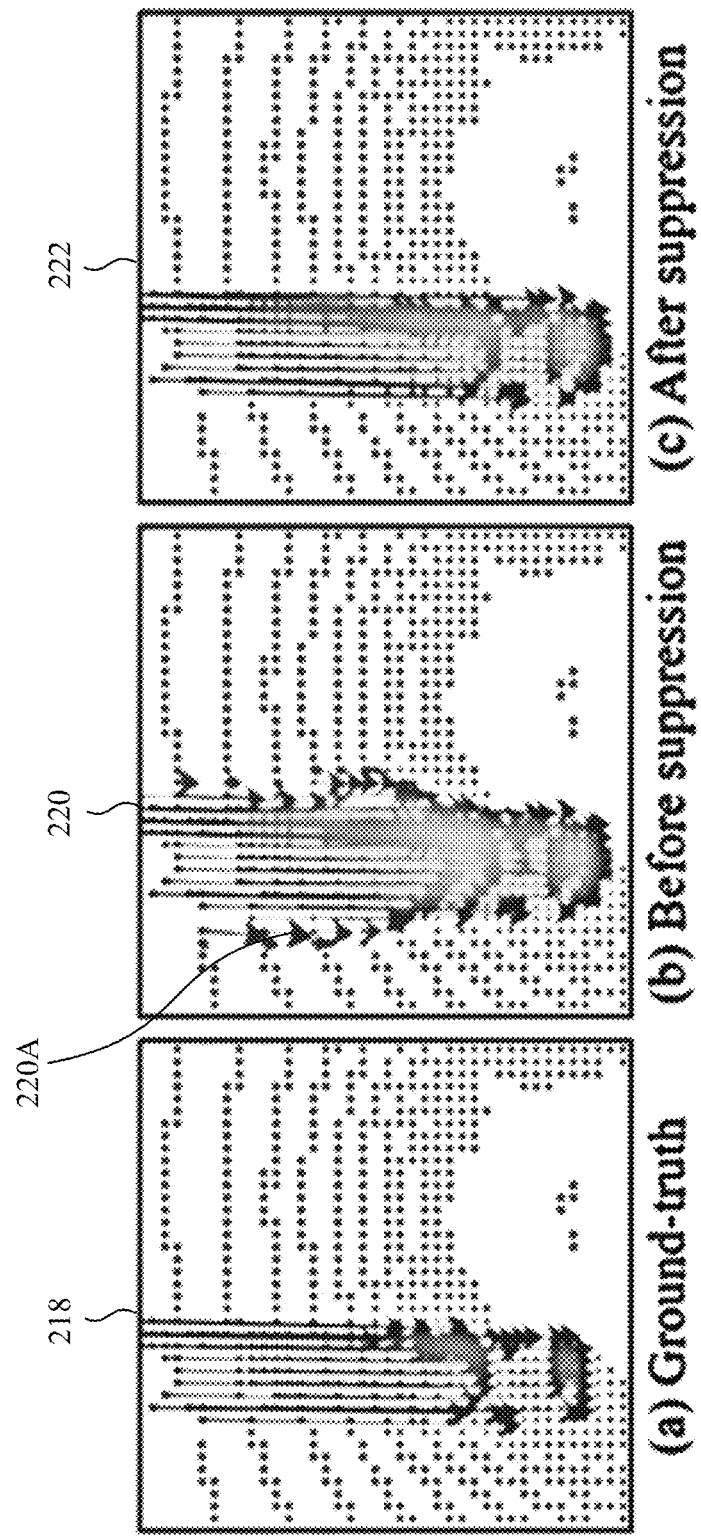
FIG. 2B illustrates a schematic of an output of a motion prediction head of the control system, according to some embodiments.

FIG. 2B illustrates a schematic of an output of the motion prediction head of the control system 100, according to some embodiments. In FIG. 2B, there is shown a ground truth 218 for the output of the motion prediction head, an output 220 of the motion prediction head before suppression of noise 220A, and an output 222 of the motion prediction head after the suppression of the noise 220A.

Figure 2C:
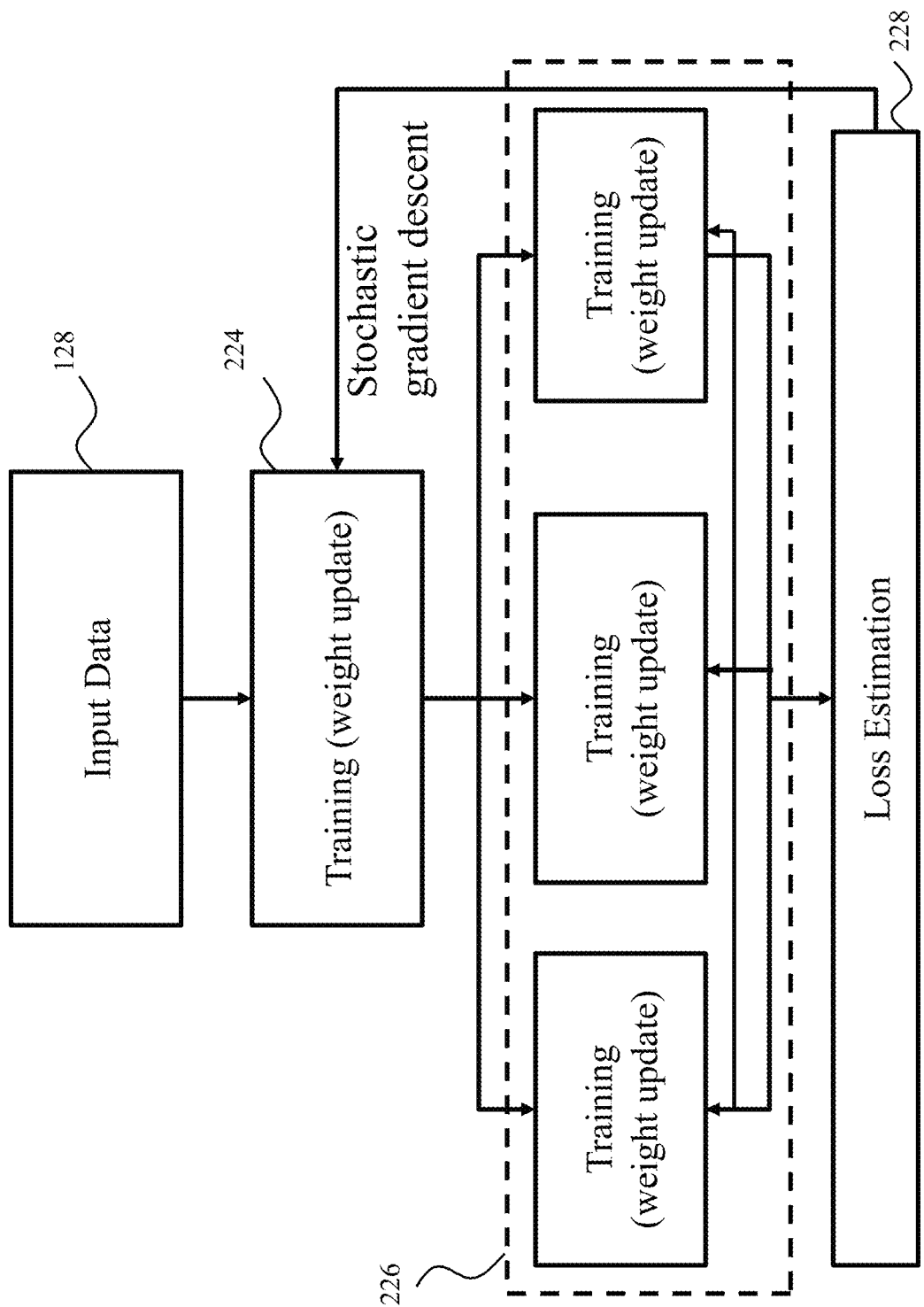
FIG. 2C illustrates a schematic of a flow diagram of loss control operations in a cell classification head, the motion prediction head, and a current motion state estimation head of the control system, according to some embodiments.

FIG. 2C illustrates a schematic of a flow diagram of loss control operations in the cell classification head, the motion prediction head, and the current motion state estimation head of the control system 100, according to some embodiments.

Operations of the processing pipeline 200 are executed by the controller 104 along with the image processor 106, the multi-head neural network 110, and the motion planner 112. The input data 128 is received via the input interface 102, at 202. The input data 128 may be measurements of an environment in which one or more objects are present. The measurements may be obtained by a plurality of sensors on the vehicle 116 such as a light detection and ranging (LiDAR) sensor, a radio detection and ranging (RADAR) sensor, a camera, and the like.

In some embodiments, the measurements may include a sequence of 3D point cloud frames. The sequence of 3D point cloud frames may be obtained by capturing one or more objects in an environment. In particular, the sequence of 3D point cloud frames may be obtained based on a sequence of LiDAR sweeps corresponding to the one or more objects in the environment, where the LiDAR sweeps are obtained from the LiDAR sensor. Alternatively, the sequence of 3D point cloud frames may be obtained based on a sequence of video frames including the one or more objects in the environment captured by the camera.

Each 3D point cloud frame in the sequence of 3D point cloud frames is associated with a coordinate system of the environment. In some embodiments, the controller 104 executes a coordinate transformation operation such that each 3D point cloud is represented in a current coordinate system (e.g., a coordinate system of the vehicle 116).

Further, BEV maps are generated from the input data 128, at 204. Some embodiments are based on a realization that 3D point clouds comprising 3D voxel lattices, unlike 2D images, are sparse and irregularly scattered, and thus cannot be processed directly with standard convolutions. To overcome such a problem, the image processor 106 converts the 3D point cloud frames into the BEV maps, which are controllable in accordance with 2D convolutions. The image processor 106 generates the BEV maps from the 3D point cloud frames by executing conventional image processing operations such as PointNet, and the like.

To generate the BEV maps, the image processor 106 represents each of the 3D point cloud frames within a current coordinate system of the vehicle 116 via coordinate transformation such that more points for static background are aggregated at a time of determining clues on motions of moving objects in the environment. More specifically, the image processor 106 quantizes 3D points into regular 3D voxels and utilizes a binary state as a proxy of the 3D voxels. The binary state indicates whether a 3D voxel is occupied by at least one point. Further, the image processor 106 converts the 3D voxel lattice into a 2D pseudo-image with a height dimension corresponding to image channels by executing conventional image processing techniques, where each pixel of the 2D pseudo-image corresponds to each point of the 3D point clouds. Such a 2D pseudo-image is virtually a BEV map, where each pixel is associated with a binary vector along a vertical axis. Accordingly, the BEV maps are generated from the 3D point clouds.

Further, features of the objects in the environment are extracted from the BEV maps, at 206. The features may be associated with spatial and temporal dimensions, and accordingly known as spatio-temporal features. The feature extraction network in the multi-head neural network 110 is configured to extract the spatio-temporal features from the BEV maps. In some embodiments, the spatio-temporal features of the one or more objects may correspond to feature channels of the BEV maps.

In some embodiments, the feature extraction network may be a spatio-temporal pyramid network (STPN) for feature extraction of the spatio-temporal features of the one or more objects. To that end, the STPN executes a series of spatio-temporal convolutions (STC) in a hierarchical manner, where each STC block consists of standard 2D convolutions, followed by a degenerate 3D convolution, to capture the spatial-temporal features, respectively. A detailed working of the STPN is described next with reference to FIG. 3A.

Output of the STPN is connected to the three heads such as the cell-classification head, the motion prediction head, and the current motion state estimation head. In some embodiments, each head of the cell classification head, the motion prediction head, and the current motion state estimation head is configured to execute two-layer 2D convolutions.

Further, the one or more objects are classified, at 208. The classification head outputs classification information indicating a category or a class of the one or more objects in the environment. The cell classification head is a classification module that includes a set of computer-executable instructions which provides a category or a class of the one or more objects in the environment. Such classification module may be based on image segmentation methods in various neural networks such as U-net, Pyramid Scene Parsing Network (PSPNet), SegNet, and the like. The cell classification head executes BEV map segmentation based on such methods and determines the category of each cell (i.e., each pixel) of the BEV maps. The cell classification head is trained to output a label of each of the one or more objects of the pixel.

The BEV map segmentation corresponds to semantic segmentation of the BEV maps to understand the environment in which the vehicle 116 may be traversing. In some embodiments, the semantic segmentation corresponds to classification of every pixel of the BEV maps into a corresponding class such as a vehicle, a pedestrian, a tree, a road, a building, and the like. Based on the classification of the pixels, the one or more objects in the environment are detected.

To that end, the BEV maps are pixel-wise annotated. More specifically, each pixel of the set of pixels is labelled with a corresponding class/category. In order to label the set of pixels of the BEV maps, the classification head utilizes conventional datasets for image segmentation such as International Society for Photogrammetry and Remote Sensing (ISPRS) Potsdam dataset, Kaggle, and the like. The one or more objects are identified by the classification head, in accordance with the classification of the set of pixels.

In some embodiments, for the cell-classification head, a shape of an output is H×W×C, where C is the number of cell categories. The cell category corresponds to the category of each pixel of the set of pixels.

In some alternative embodiments, the one or more objects in the environment may be identified based on bounding-box-detection techniques. Bounding boxes are imaginary boxes that are around the one or more objects that are being checked for collision, like pedestrians on or close to the road, other vehicles and signs. In digital image processing, a bounding box is coordinates of a rectangular border that fully encloses a digital image when it is placed over a page, a canvas, a screen or other similar bi-dimensional background. To identify the one or more objects in the environment, a 2D representation or a 3D representation of the environment may be received by the control system 100. Further, the classification head may execute operations associated with bounding box detection of the one or more objects via 2D object detection based on camera data, 3D object detection based on LiDAR data, or fusion-based detection. The detected bounding boxes are then fed into an object tracker to identify the one or more objects. Further, output of the object tracker may be provided to the motion prediction head to determine future positions of the detected bounding boxes.

Further, motion of the one or more objects is predicted, at 210. The motion prediction head outputs motion information indicating future positions of the one or more objects in the environment. In particular, the motion prediction head is trained to output a prediction of motion of the pixel corresponding to the motion of the one or more objects. In some embodiments, the motion prediction head is a module that predicts positions of pixels of the BEV maps into future. The motion prediction head includes computer-executable algorithms which are executed to predict the positions of the pixels. Examples of such algorithms include conventional image processing algorithms such as a block-matching algorithm, optical flow estimation based on Lucas-Kanade method, and the like.

For motion prediction head, predicted pixel positions are represented as $$\{X^{(\tau)}\}_{\tau=t}^{t+N},$$

where $X^{(\tau)} \in R^{H \times W \times 2}$ denotes the positions at time $\tau$, t is the current time, and N is the number of future frames. Accordingly, an output shape N×H×W×2 is obtained.

In some alternative embodiments, the motion prediction head predicts the motion of the detected bounding boxes by tracking positions of the bounding boxes in the environment.

Further, a state of each of the one or more objects is estimated, at 212. The current motion state estimation head outputs occupancy information indicating a state of each of the one or more objects in the environment. In particular, the current motion state estimation head is trained to output whether each of the one or more objects is static or moving.

In some embodiments, the current motion state estimation head is a module including computer-executable instructions to estimate motion status for each pixel of the BEV maps. The motion state of each pixel may be one of static or moving. In order to estimate the state of the pixel, position of the pixel is determined in each BEV map of the BEV maps in accordance with the spatio-temporal features obtained from the output of the STPN. In case a pixel is determined to be present at a same location in each BEV map, then the state of the pixel is the static state. In case, a pixel is determined to be present at different position in at least two BEV maps, then the state of the pixel is the moving state. A shape of output by the current motion state estimation head is H×W, where each element denotes the probability of being static.

In some embodiments, the cell classification head, the motion prediction head, and the current motion state estimation head are concurrently operated such that accurate extended BEV maps are generated. More specifically, each of the cell classification head, the motion prediction head, and the current motion state estimation head indirectly transfer information to each other while executing their respective operations such that undesirable jitters are avoided from the output of each of the cell classification head, the motion prediction head, and the current motion state estimation head.

In some embodiments, the multi-head neural network 110 utilizes losses of each of the cell classification head, the motion prediction head, and the current motion state estimation head to execute post processing operations for improving quality of the extended BEV image. In such a case, operation of each of the cell classification head, the motion prediction head, and the current motion state estimation head is controlled such that an accurate extended BEV image if obtained with negligible error.

For instance, the current motion state estimation head provides auxiliary information to the motion prediction head for the motion prediction such that undesirable jitters are removed from the output of the motion prediction head. Referring to FIG. 2B, the motion prediction head may be trained with a regression loss (e.g., smooth L1). However, naive regression of the future positions of pixels may lead to undesirable jitters (i.e., the noise 220A) of static pixels. In order to overcome such a problem, outputs from the cell classification head and the current motion state estimation head are utilized to regularize predicted pixel trajectories in accordance with the ground truth 218 for the output of the motion prediction head.

In some embodiments, the image processor 106 ignores the output of the motion prediction head when the pixel is classified as a background, in such a case an object of the pixel is estimated as static, or combination thereof. To that end, the image processor 106 sets a threshold level for motion of the pixels. In order to ignore an output of the motion prediction head, motion prediction of each pixel is set to zero, which also results in removal of the undesirable jitters from the motion of the static pixels. Accordingly, motion prediction head predicts the position of the pixels without considering the pixels which are predicted as the background, static, or combination thereof. Therefore, the motion prediction head accurately predicts the position of the pixels in the BEV maps.

Referring to FIG. 2C, the multi-head neural network 110 jointly minimizes the losses associated with each of the cell classification head, the motion prediction head, and the current motion state estimation head. In some embodiments, the multi-head neural network 110 may be jointly trained to update weight of each of the cell classification head, the motion prediction head, and the current motion state estimation head at step 224, based on loss estimation (at step 228) of the cell classification head, the motion prediction head, and the current motion state estimation head. Such loss estimation is cumulative loss estimation. The multi-head neural network 110 utilizes iterative methods for optimizing a loss function such as a Stochastic Gradient Descent (SGD) method. In SGD method, a previous weight associated with each of the cell classification head, the motion prediction head, and the current motion state estimation head is updated in accordance with output of the loss estimation (at step 228) in an iterative manner until loss in each of the cell classification head, the motion prediction head, and the current motion state estimation head is minimized at a desired level (i.e., a threshold loss level).

In some embodiments, a cross-entropy loss may be associated with each of the classification head and the current motion state estimation head, where each category term of the one or more objects is assigned with a different weight so as to handle a class imbalance issue. In case of the motion prediction head, a weighted smooth L1 loss is compensated. In such a case, weight for each category of the one or more objects is determined based on specification of the classification head. Such losses in each of the cell classification head, the motion prediction head, and the current motion state estimation head are only able to regularize global training of the multi-head neural network 110 in order to generate accurate extended BEV maps.

Therefore, losses in each of the cell classification head, the motion prediction head, and the current motion state estimation head are jointly compensated such that accurate information is exchanged between each of the cell classification head, the motion prediction head, and the current motion state estimation head to generate the extended BEV maps.

Further, output of each of the classification head, the motion prediction head, and the current motion state estimation head is utilized to generate extended BEV maps for each time step, at 214. The image processor 106 encodes the BEV maps with the motion information, the occupancy information, and the classification information such that extended BEV maps are generated. Each extended BEV map of the extended BEV maps may correspond to a 2D image, and also called as an extended BEV image. Each extended BEV map includes a set of pixels, where each pixel in the set of pixels is classified with a label of an object occupying a location corresponding to a position of the pixel in the extended BEV image at a current time step. Further, at least some pixels are associated with a time sequence of future positions of each pixel in subsequent time steps representing a prediction of a future motion of the object.

In some embodiments, the extended BEV image is further provided to the motion planner 112 to produce the motion trajectory, at 216. More specifically, the motion planner 112 utilizes the position of set of pixels in the extended BEV maps to determine positions of the one or more objects in the environment. In accordance with the determined positions of the one or more objects, the motion planner generates a motion trajectory.

In some embodiments, the motion planner 112 produces the motion trajectory while satisfying constraints on the motion of the vehicle 116. As referred herein, the constraints on the motion of the vehicle 116 are requirements that the motion of the vehicle 116 should fulfil in order to provide a safe and smooth ride of users of the vehicle 116 and the environment. While the spatial constraints on the vehicle 116 make sure that the vehicle 116 behaves as desired at certain combinations of time and place, the constraints on the motion of the vehicle 116 concerns the motion used to reach the different positions of the vehicle 116. Examples of the constraints on the motion of the vehicle 116 include a bound on a change from a current acceleration and a heading angle and heading rate of the vehicle 116, a bound on a deviation from a desired velocity profile of the vehicle 116, a bound on the lateral velocity of the vehicle 116, a bound on the velocity deviations from surrounding vehicles, and the velocity and heading profile when completing a lane change or when passing another vehicle. Such constraints are received by the control system 100 via the input interface 102, as vehicle parameters, from one or more sensors of the vehicle such as a speedometer, an accelerometer, one or more cameras, and the like.

Further, the control system 100 receives geographical information of the environment in which the vehicle 116 is traversing. The geographical information may be received, via the input interface 102, from the one or more sensors of the vehicle 116 such as a geo-position tracker. Further, the motion planner 112 fuses the vehicle parameters with the geographical information and the extended BEV image to produce the motion trajectory. In some embodiments, the control system 100 receives inputs associated with destination information from an occupant of the vehicle 116. In such a case, the motion planner fuses the vehicle parameters, the geographical information, the destination information, and the extended BEV maps to produce the motion trajectory. Accordingly, the control system 100 facilitates the motion trajectory which is utilized to control operations of the vehicle 116. For instance, the motion trajectory includes a set of commands for actuators of the vehicle 116 to move the vehicle 116.

Figure 3A:
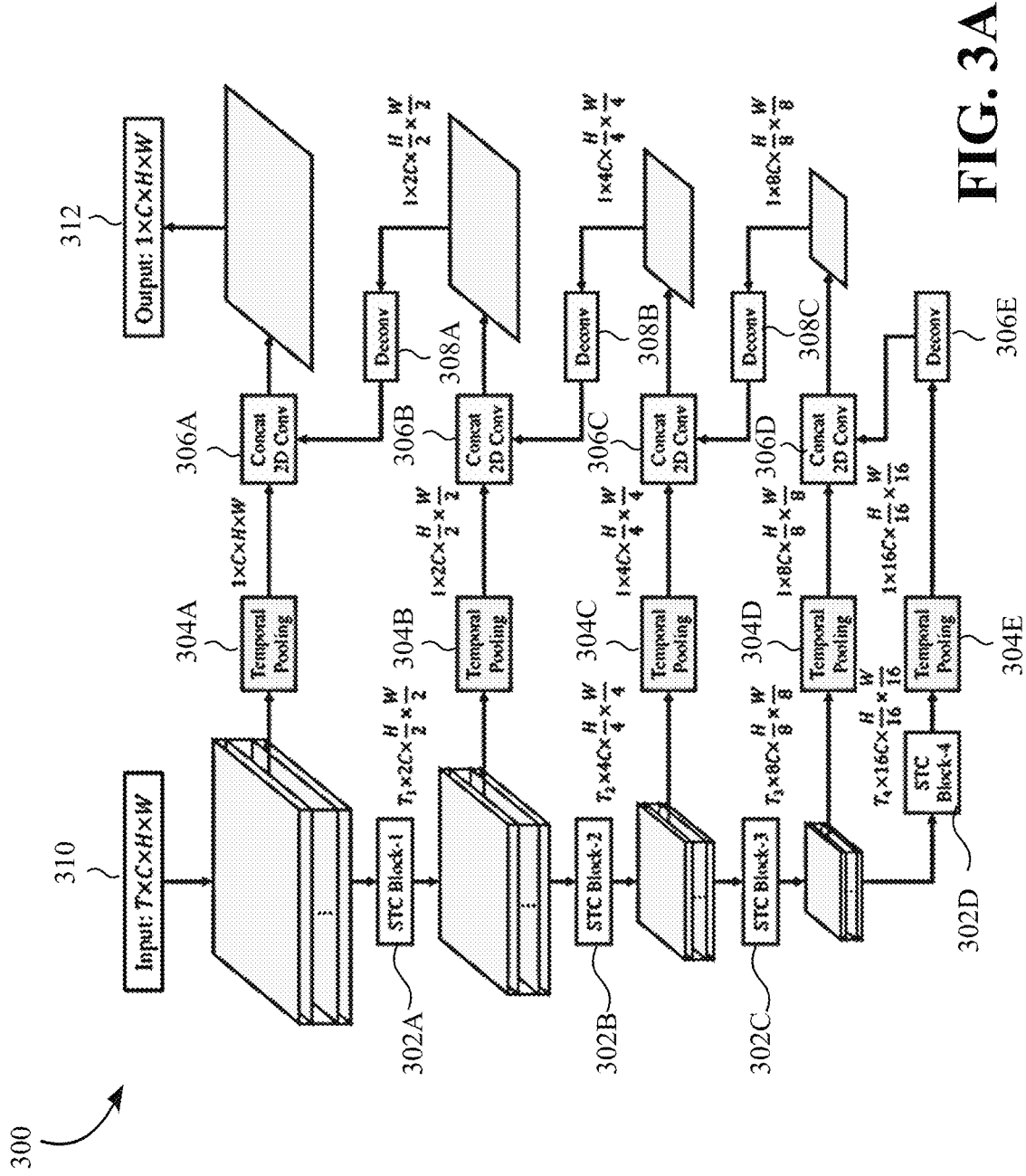
FIG. 3A illustrates a spatio-temporal pyramid network (STPN) of the control system, according to some embodiments.

FIG. 3A illustrates a spatio-temporal pyramid network (STPN) 300 of the control system 100, according to some embodiments.

Figure 3B:
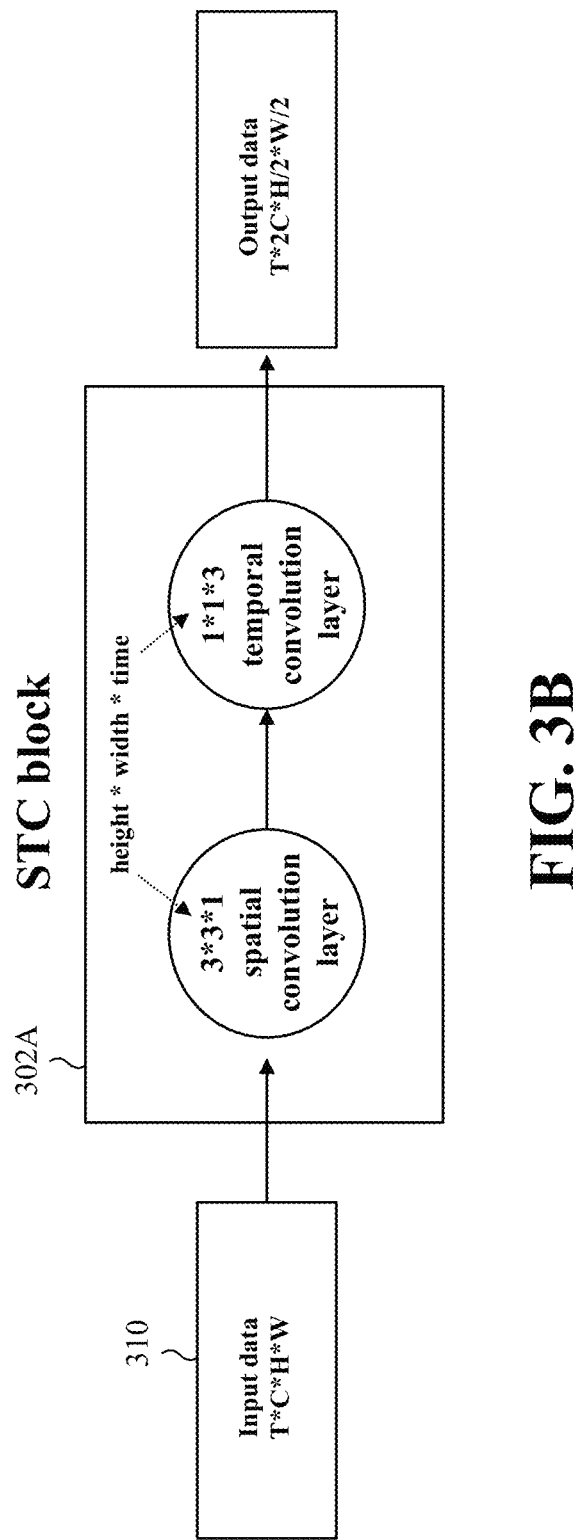
FIG. 3B illustrates a schematic of a spatio-temporal convolution (STC) block of the STPN, according to some embodiments.

FIG. 3B illustrates a schematic of a spatio-temporal convolution (STC) block of the STPN 300, according to some embodiments.

Figure 3C:
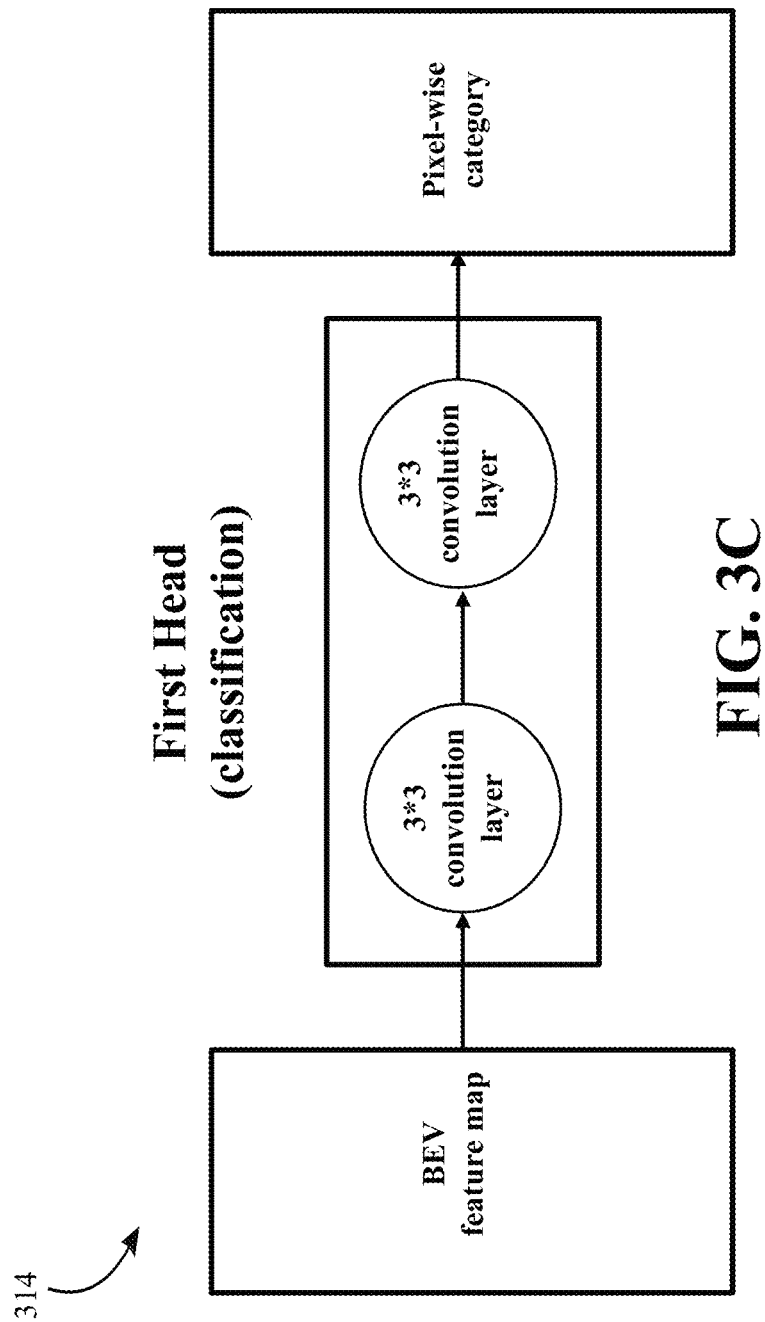
FIG. 3C illustrates a schematic of classification operation executed by the classification head of the control system, according to some embodiments.

FIG. 3C illustrates a schematic of classification operation 314 executed by the classification head of the control system 101, according to some embodiments.

Figure 3D:
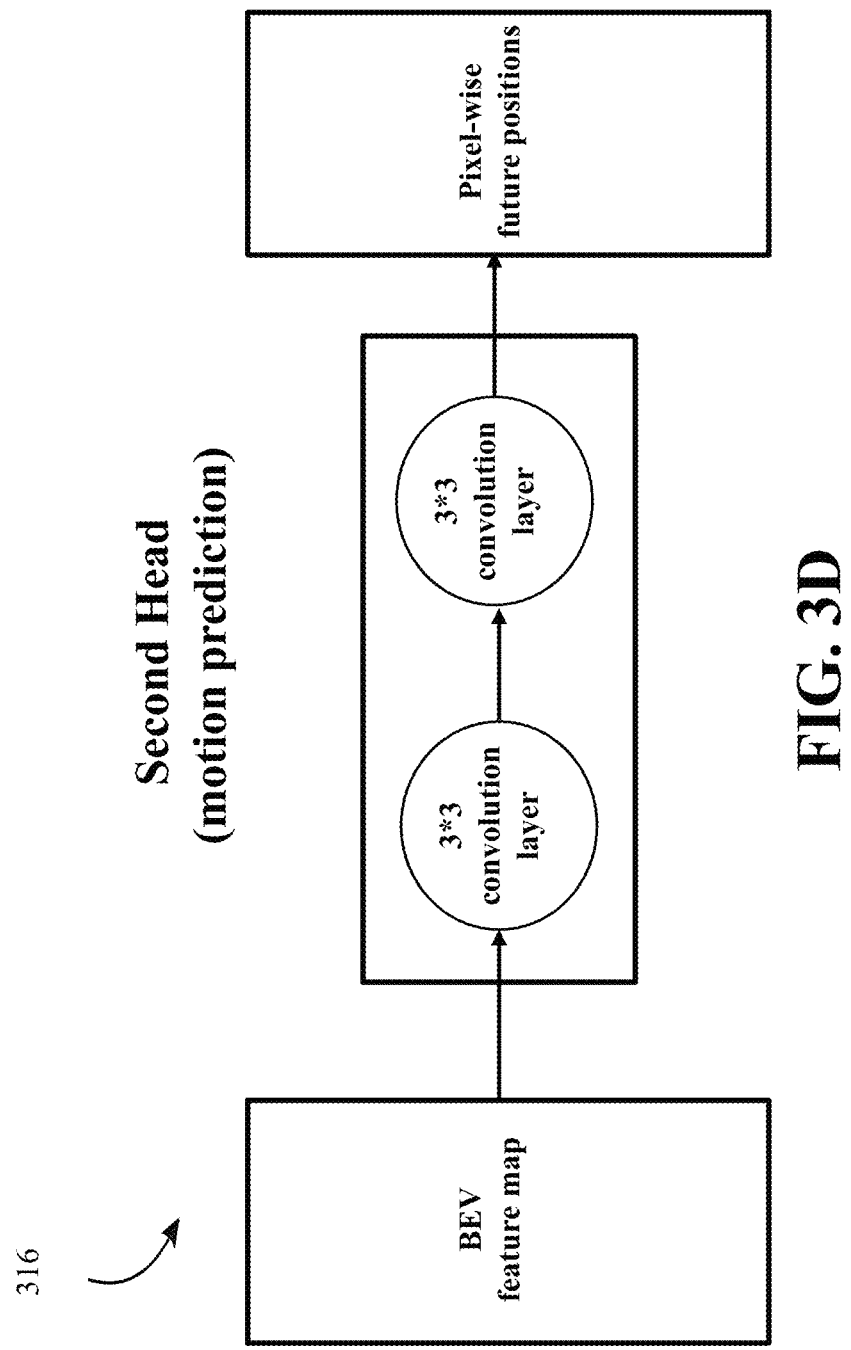
FIG. 3D illustrates a schematic of motion prediction operation executed by the motion-prediction head of the control system, according to some embodiments.

FIG. 3D illustrates a schematic of motion prediction operation 316 executed by the motion-prediction head of the control system 101, according to some embodiments.

Figure 3E:
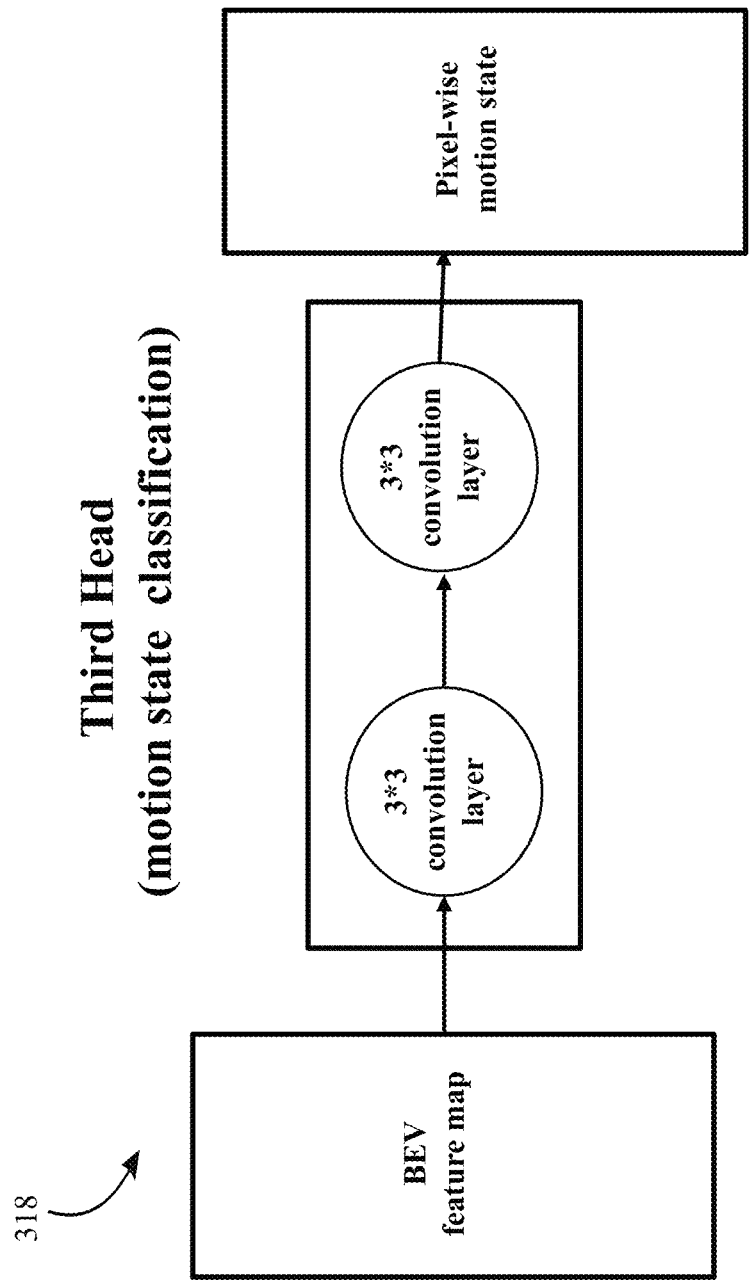
FIG. 3E illustrates a schematic of motion state classification operation executed by the current motion state estimation head of the control system, according to some embodiments.

FIG. 3E illustrates a schematic of motion state classification operation 318 executed by the current motion state estimation head of the control system 101, according to some embodiments.

In some embodiments, the multi-head neural network 110 includes the STPN 300. Referring to FIG. 3A, a basic building block of the STPN 300 is a spatio-temporal convolution (STC) block. In FIG. 3A, there is shown a sequence of STC blocks 302A to 302D (i.e., STC Block-1 to STC Block-4) in a hierarchical manner Each STC block enlarges information in channels of an input and shrinks space dimension and temporal dimension of the input forming a pyramid structure of the STPN 300.

Further, there is shown a plurality of layers in the STPN 300 such as a temporal pooling layer, a concatenation layer, and a deconvolution layer. The plurality of layers in the STPN 300 is utilized to enable information flow across the STPN 300. The temporal pooling layer include a set of temporal pooling units 304A to 304E, where each unit of the temporal pooling units 304A to 304E is connected to a corresponding STC block of the sequence of STC blocks 302A to 302D. The concatenation layer includes a set of units as concat 2D convolution units 306A to 306E, where each unit of the concat 2D convolution units 306A to 306E is connected to a corresponding unit of the temporal pooling units 304A to 304E. Further, the deconvolution layer includes a set of units as deconvolution units 308A to 308C, where each unit of the deconvolution units 308A to 308C is connected to an output stage of one unit of the concat 2D convolution units 306A to 306E and an input stage of another unit of the concat 2D convolution units 306A to 306E. Further, the STPN includes an input stage 310 to receive the BEV maps as an input and an output stage 312 to output the spatio-temporal features of the one or more objects in the environment based on the BEV maps. The input stage 310 is connected to a first STC block 302A of the sequence of STC blocks 302A to 302E. Further, the output stage 312 of the STPN 300 is connected to an output stage of a first unit 306A of the concat 2D convolution units 306A to 306E.

Some embodiments are based on a realization that a movement of an object in an environment can be determined from spatio-temporal features of the object. To that end, the STPN 300 computes a feature hierarchy over space domain and time domain with the sequence of STC blocks 302A to 302D. Each STC block consists of a standard 2D convolution, followed by a degenerate 3D convolution, to capture spatial and temporal features, respectively. Each STC block of the sequence of STC blocks 302A to 302D executes 2D convolution in the space domain. In some embodiments, each STC block includes a 3*3*1 spatial convolution layer and a 1*1*3 temporal convolution layer, as shown in FIG. 3B with regard to the STC block 302A. Further, the output of the 2D convolution from each of the sequence of STC blocks 302A to 302D is concatenated by the concat 2D convolution units 306A to 306E. A kernel size of the 3D convolution is k×1×1, where k corresponds to the temporal dimension. Such a 3D filter is essentially a pseudo-1D convolution and thus enables a reduction of complexity of the control system 100.

In operation, the input stage 310 receives a sequence of 2D pseudo-images (i.e., the BEV maps) as T*C*H*W with multiple channels as the input. More specifically, the sequence of STC blocks 302A to 302D receives the BEV maps as the input. The sequence of STC blocks 302A to 302D iteratively processes the input in a forward direction, such that the output of one STC block (e.g., an output of the STC block as $T_1$*2C*H/2*w/2) is an input to a next STC block (e.g., 302B). Further, the STPN 300 combines the outputs of the sequence of STC blocks 302A to 302D processed by temporal pooling in a reverse direction, such that a combination of two STC blocks' outputs is combined with the output of the previous STC block. The temporal pooling is executed by the temporal pooling units 304A to 304E. For each combination, an output of the temporal pooling for each STC block is convolved with a deconvolution of a subsequent STC block by the deconvolution units 308A to 308C. In such a manner, spatial information is combined with temporal information while preserving pyramid structure in both directions/dimensions.

In some embodiments, the output of each STC block processed with the temporal pooling by the preserves a largest value across temporal dimension of the output of each STC block to shrink the temporal dimensions of the output into one. In some embodiments, the output (i.e., 1*C*H*W) of the STPN 300 may correspond to a BEV feature map. Further, the output of the STPN 300 is delivered to each of the cell classification head, the current motion state estimation head, and the motion prediction head in order to produce the extended BEV maps. More specifically, the output of the STPN 300 may correspond to time information and spatial information of the set of pixels of the BEV maps. Based on such output, each of the cell classification head, the current motion state estimation head, and the motion prediction head outputs a class, a state, and motion prediction of each pixel in the BEV maps, respectively.

In some embodiments, each of the classification head, the motion prediction head, and the current motion state estimation head includes one or more convolution layers (e.g., 3*3 convolution layers) to generate the extended BEV image. Referring to FIG. 3C, the output (i.e., the BEV feature map) of the STPN 300 is provided to a first head (i.e., the classification head) in the multi-head neural network 110 of the control system 100. The classification head outputs the classification information indicating a category or a class of the one or more objects in the environment. To that end, the classification head executes classification of each pixel in the BEV feature map into a corresponding class such as a vehicle, a pedestrian, a tree, a road, a building, and the like. Accordingly, the classification head outputs category of each pixel of the BEV feature map as a pixel-wise category. A detailed working of the classification head is described above with reference to FIG. 2A, at 208.

Referring to FIG. 3D, the BEV feature map from the STPN 300 is provided to a second head (i.e., the motion prediction head) of the multi-head neural network 110 of the control system 100. The motion prediction head predicts motion of each pixel of the BEV feature map corresponding to the motion of the one or more objects in the environment. In particular, the motion prediction head predicts positions of pixels of the BEV feature map into future. Accordingly, the motion prediction head outputs pixel-wise future positions of the one or more objects in the environment. A detailed working of the classification head is described above with reference to FIG. 2A, at 210.

Referring to FIG. 3E, the BEV feature map from the STPN 300 is provided to a third head (i.e., the current motion state estimation head) of the multi-head neural network 110 of the control system 100. The current motion state estimation head determines a state of each of the one or more objects in the environment based on a state of each pixel by utilizing the BEV feature map, where the state may be a static state or a moving state. Accordingly, the current motion state estimation head outputs pixel-wise motion state which is one of the static state or the moving state. A detailed working of the classification head is described above with reference to FIG. 2A, at 212.

In some embodiments, all three heads (i.e., the cell classification head, the current motion state estimation head, and the motion prediction head) in the multi-head neural network 110 are jointly trained to operate through stochastic gradient descent in an end-to-end manner, as described above with reference to FIG. 2C. To that end, each head receives output of the STPN 300 (i.e., the BEV feature map) at a same time instant such that a joint operation is performed by all the three heads to generate the extended BEV image. Due to joint operations of the cell classification head, the current motion state estimation head, and the motion prediction head, all the three heads shares information with each other at a time of executing their respective function such that unnecessary information for generation of the extended BEV image is detected. Such unnecessary information is discarded further and an accurate extended BEV image is generated with minimum losses. In particular, one head of the three heads utilizes output of another head of the three heads to execute a corresponding operation of the one head.

For instance, the motion prediction head utilizes output of the current motion state estimation head, where the output is one of a static state or a dynamic state of an object. Further, the motion prediction head discards execution of prediction of motion of the object which is associated with the static state. Accordingly, unnecessary processing of data is discarded by the motion prediction head and an accurate extended BEV image is generated at the output of the multi-head neural network 110. Therefore, such interdependency among the heads facilitates an extended BEV image of high quality.

Figure 4:
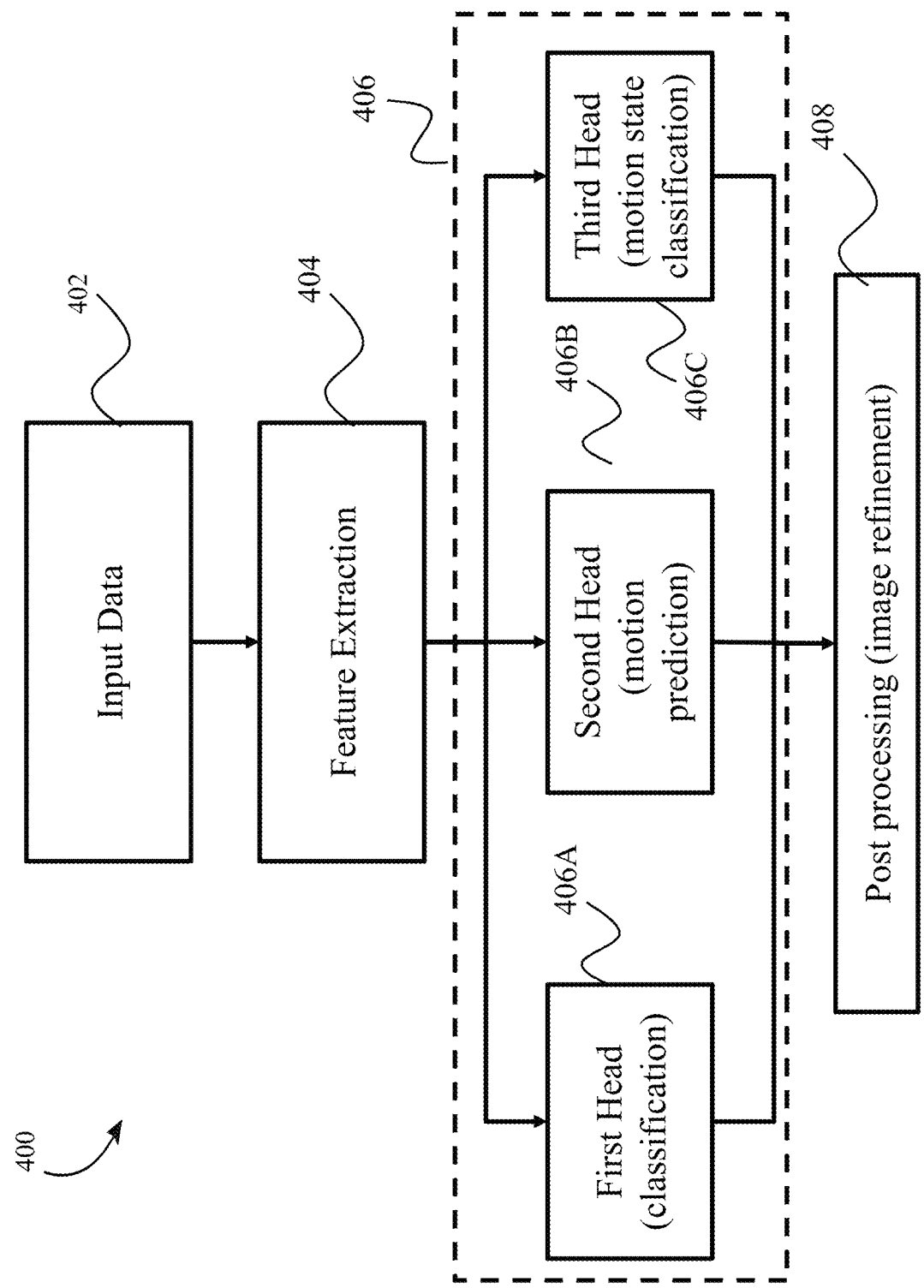
FIG. 4 illustrates a flow diagram of operations executed by the multi-head neural network of the control system, according to some embodiments.

FIG. 4 illustrates a flow diagram 400 of operations executed by the multi-head neural network 110 of the control system 100, according to some embodiments. There is shown a set of operations 402-408 which are executed by the multi-head neural network 110 to generate the extended BEV image. The multi-head neural network receives input data, at 402. The input data may be the BEV maps generated by the image processor 106 of the control system 100. Further, the multi-head neural network 110 executes feature extraction operation, at 404. The feature extraction operation is executed by the STPN 300 in the multi-head neural network, where an output (i.e., the BEV feature map) of the feature extraction operation includes spatio-temporal features of the one or more objects indicated in the BEV map. Further, all three heads (i.e., the first head as the cell classification head, the second head as the motion prediction head, and the third head as the current motion state estimation head) of the multi-head neural network 110 jointly execute their respective operations such as classification, motion prediction, and motion state classification at 406. A detailed working of all the three heads is described above with reference to FIGS. 2A and 3B-3E.

Further, the multi-head neural network 110 generates the extended BEV image based on the outputs of each of the first head, the second head, and the third head. After the generation of the extended BEV image, the multi-head neural network 110 further executes image refinement operations, at 408. Such post processing operations (i.e., the image refinement operations) improves quality of the extended BEV image. To that end, the multi-head neural network 110 utilizes losses of all the three heads. A detailed working the loss control functions of all the three heads is described above with reference to FIG. 2C. Accordingly, an accurate extended BEV image is generated.

Figure 5A:
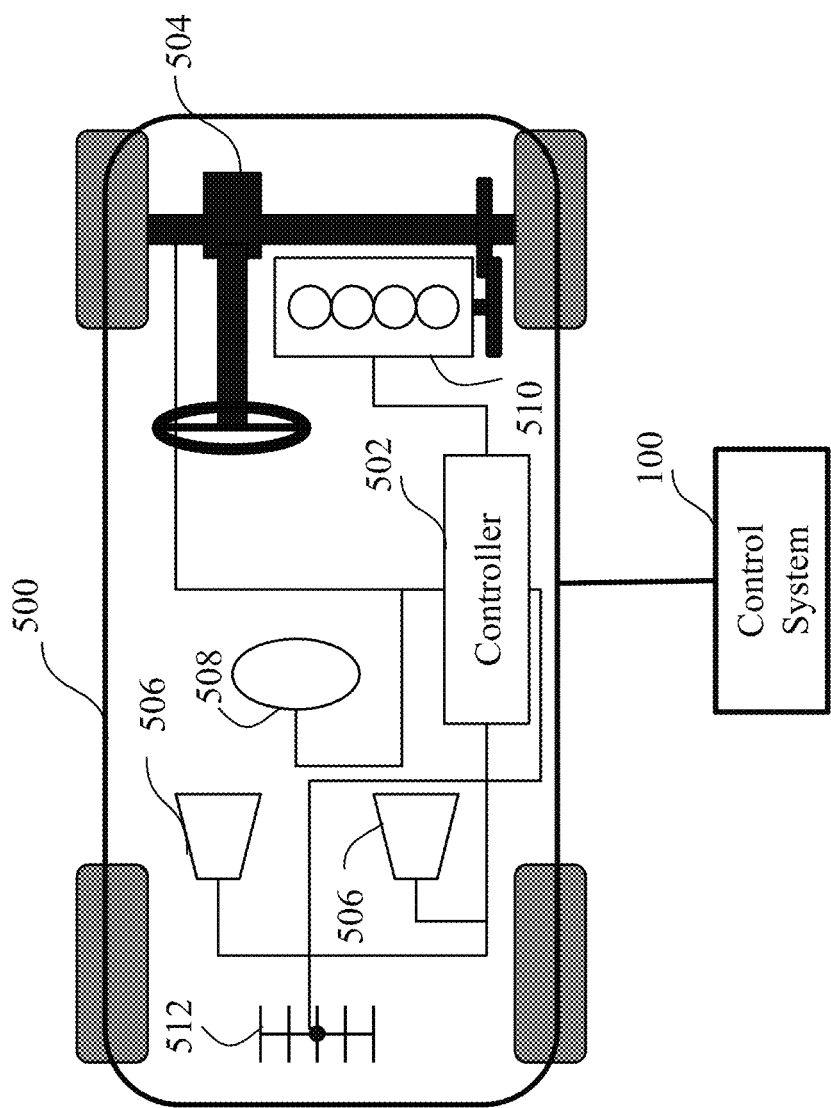
FIG. 5A illustrates a schematic of a vehicle including a controller in communication with the control system, according to some embodiments.

FIG. 5A illustrates a schematic of a vehicle 500 including a controller 502 in communication with the control system 100, according to some embodiments.

The vehicle 500 can be any type of wheeled vehicle, such as a passenger car, bus, or rover. Further, the vehicle 500 can be an autonomous vehicle or a semi-autonomous vehicle. The vehicle 500 may correspond to the vehicle 116.

In some implementations, motion of the vehicle 500 is controlled. For example, lateral motion of the vehicle 500 is controlled by a steering system 504 of the vehicle 500. In one embodiment, the steering system 504 is controlled by the controller 502. Additionally, or alternatively, the steering system 504 can be controlled by a driver of the vehicle 500.

Further, the vehicle 500 includes an engine 510, which may be controlled by the controller 502 or by other components of the vehicle 500. The vehicle 500 may also include one or more sensors 506 to sense surrounding environment of the vehicle 500. Examples of the sensors 506 include, but are not limited to, distance range finders, RADARs, LiDARs, and cameras. The vehicle 500 may also include one or more sensors 506 to sense current motion quantities and internal status, such as steering motion of the vehicle 500, wheel motion of the vehicle 500, or and the like. Examples of the sensors 506 include, but are not limited to, a global positioning system (GPS), accelerometers, inertial measurement units, gyroscopes, shaft rotational sensors, torque sensors, deflection sensors, a pressure sensor, and flow sensors. The vehicle 500 may be equipped with a transceiver 512 enabling communication capabilities of the controller 502 through wired or wireless communication channels with control system (e.g., the control system 100). For example, through the transceiver 512, the controller 502 receives the motion trajectory, and controls actuators and/or other controllers of the vehicle according to the received motion trajectory in order to control mobility of the vehicle 500.

Figure 5B:
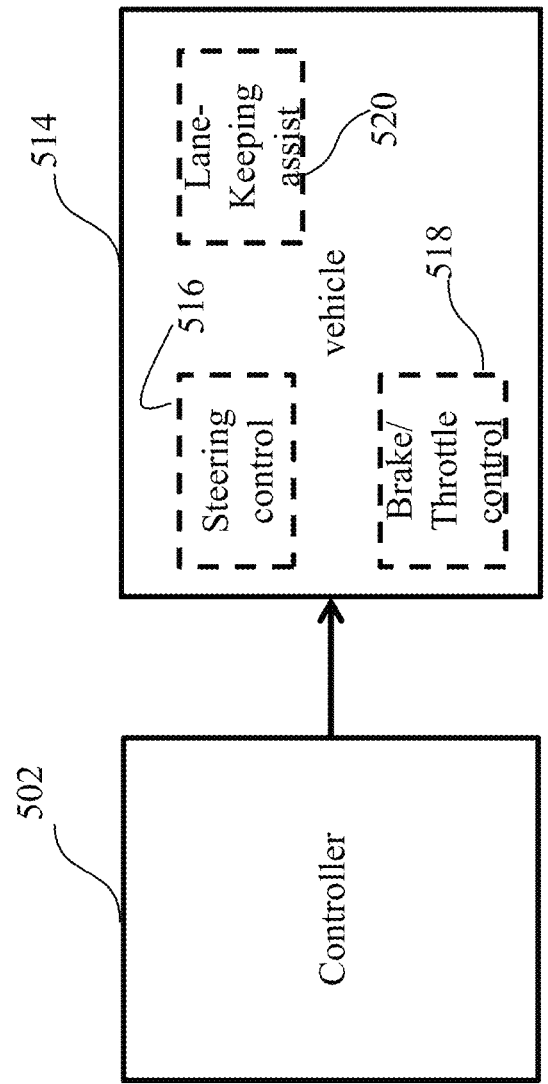
FIG. 5B illustrates a schematic of interaction between a set of control units of the vehicle for controlling motion of the vehicle, according to some embodiments.

FIG. 5B illustrates a schematic of interaction between a set of control units 514 of the vehicle 500 for controlling motion of the vehicle, according to some embodiments. For example, in some embodiments, the set of control units 514 of the vehicle 500 includes a steering control unit 516 and brake/throttle control unit 518 that control rotation and acceleration of the vehicle 500. In such a case, the controller 502 outputs control inputs to the set of control units 514 to control the state of the vehicle 500. Further, the set of control units 514 may also include high-level controllers, e.g., a lane-keeping assist control unit 520 that processes the control inputs of the controller 502. In both cases, the set of control units 514 utilizes outputs of the controller 502 to control at least an actuator of the vehicle 500 (such as the steering wheel and/or the brakes of the vehicle 500) in order to control the motion of the vehicle 500.

FIG. 5C shows a schematic of a motion trajectory 526 for the vehicle 500, according to some embodiments. In FIG. 5C, there is shown a road 522 on which the vehicle 500 is traversing along with a set of vehicles 524A to 524C. There is further shown the motion trajectory 526, on the road 522, associated with the vehicle 500. The motion trajectory 526 is generated by the control system 100 and is received by the vehicle 500 via the transceiver 512 of the vehicle 500 as control inputs. Further, the actuators of the vehicle 500 are controlled based on the motion trajectory 526 in order to control motion of the vehicle 500. Accordingly, the vehicle 500 traverses the road 522 based on the motion trajectory 526 without obstacles.

In some embodiments, to control the vehicle 500, the control inputs include commands specifying values of one or combination of a steering angle of the wheels of the vehicle 500 and a rotational velocity of the wheels, and the measurements include values of one or combination of a rotation rate of the vehicle 500 and an acceleration of the vehicle 500. Each state of the vehicle 500 includes a velocity and a heading rate of the vehicle 500, such that the motion model relates the value of the control inputs to a first value of the state of the vehicle 500 through dynamics of the vehicle 500 at consecutive time instants, and the measurement model relates the value of the measurement to a second value of the state of the vehicle 500 at the same time instant. Accordingly, the motion of the vehicle 500 is controlled.

Figure 6:
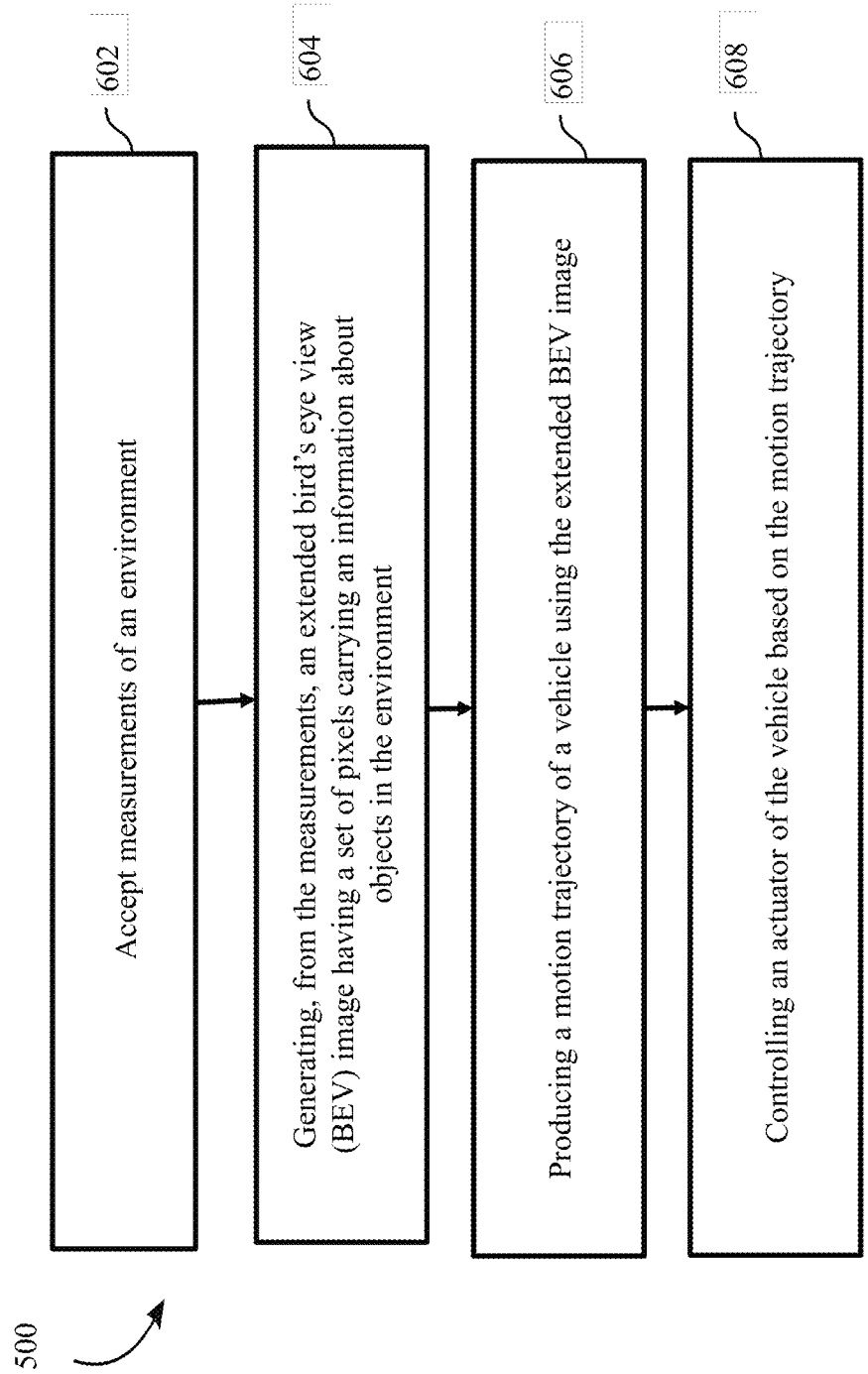
FIG. 6 illustrates a schematic of workflow for controlling the motion of the vehicle, according to some embodiments.

FIG. 6 illustrates a schematic of workflow 600 for controlling the motion of the vehicle 116 (or the vehicle 500), according to some embodiments. The workflow is executed by the controller 104 of the control system 100. The controller 104 controls operation executed by the image processor 106, the multi-head neural network 110, and the motion planner 112 to control the motion of the vehicle 116. To that end, measurements of an environment are accepted by the control system 100 via the input interface 102, at 602. The measurements may be a sequence of 3D point clouds.

Further, an extended bird's eye view (BEV) image is generated, 604. The image processor 106 generates the extended BEV image via the multi-head neural network 110. The multi-head neural network 110 includes the cell classification head, the motion prediction head, the current motion state estimation head, and a feature extraction network such as the STPN 300 that collectively generates the extended BEV image, as described in description of FIG. 2A, FIG. 2B, and FIG. 3A. The extended BEV image includes a set of pixels carrying information about objects in the environment, where a pixel in the set of pixels is classified with a label of an object occupying a location corresponding to a position of the pixel in the extended BEV image at a current time step. Further, the pixel is associated with a time sequence of future positions of the pixel in subsequent time steps representing a prediction of a future motion of the object After the extended BEV image is generated, a motion trajectory of the vehicle 116 using the extended BEV image is generated, at 606. The motion planner 112 generates the motion trajectory based on the extended BEV image. More specifically, the motion planner 112 utilizes positions of the object in the extended BEV image to produce the motion trajectory. Further, the actuator of the vehicle 116 is controlled based on the motion trajectory, at 608. Accordingly, the motion of the vehicle 116 is controlled by controlling the actuator of the vehicle 116 based on the produced motion trajectory.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, if understood by one of ordinary skill in the art the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A control system for controlling a motion of a vehicle, comprising: a processor; and a memory having instructions stored thereon that, when executed by the processor, cause the control system to:

submit the measurements to a multi-head neural network to generate an extended bird's eye view (BEV) image having a set of pixels carrying information about objects in the environment based on the measurements, wherein a pixel in the set of pixels is associated with a time sequence of future positions of the pixel in subsequent time steps representing a prediction of a future motion of an object, wherein the multi-head neural network includes a feature extraction network connected to a cell classification head, a motion prediction head, and a current motion state estimation head jointly trained with each other;

produce a motion trajectory of the vehicle using the extended BEV image; and control an actuator of the vehicle based on the motion trajectory.

2. The control system of claim 1, wherein the cell classification head is trained to output a label of the object of the pixel, wherein the current motion state estimation head is trained to output whether the object is static or moving, and wherein the motion prediction head is trained to output a prediction of motion of the pixel corresponding to motion of the object.

3. The control system of claim 2, wherein the processor determines the time sequence of future positions of the pixel based on the outputs from the motion prediction head.

4. The control system of claim 2, wherein the processor ignores the output of the motion prediction head when the pixel is classified as a background, the object of the pixel is estimated as static, or combination thereof.

5. The control system of claim 1, wherein the feature extraction network is a spatio-temporal network configured to extract feature in both spatial and temporal dimensions.

6. The control system of claim 1, wherein the feature extraction network includes a spatio-temporal pyramid network (STPN) for feature extraction.

7. The control system of claim 6, wherein the STPN includes a sequence of spatio-temporal convolution (STC) blocks, each STC block enlarges information in channels of an input and shrinks space and temporal dimensions of the input forming a pyramid structure of the STPN.

8. The control system of claim 7, wherein the output of each STC block is processed with a temporal pooling that preserves a largest value across temporal dimension of the output of the STC block to shrink the temporal dimensions of the output into one.

9. The control system of claim 8, the sequence of STC blocks of the STPN iteratively process the input in a forward direction, such that the output of one STC block is an input to the next STC block, wherein the STPN combines the outputs of the STC blocks processed by the temporal pooling in a reverse direction, such that a combination of two STC outputs is combined with the output of the previous STC block.

10. The control system of claim 1, wherein
each of the cell classification head, the motion prediction head, and the current motion state estimation head operate concurrently.

11. The control system of claim 1, wherein the measurements correspond to a sequence of three dimensional (3D) point clouds, and wherein the sequence of 3D point clouds is generated from one of a light detection and ranging (LiDAR) sensor or a radio detection and ranging (RADAR) sensor.

12. The control system of claim 1, wherein the pixel is classified with a label of the object occupying a location corresponding to a position of the pixel in the extended BEV image at a current time step.

13. A method for controlling a motion of a vehicle, comprising:
accepting measurements of an environment;
generating, from the measurements, an extended bird's eye view (BEV) image having a set of pixels carrying an information about objects in the environment, wherein a pixel in the set of pixels is associated with a time sequence of future positions of the pixel in subsequent time steps representing a prediction of a future motion of an object, wherein the extended BEV image is generated via a multi-head neural network including a feature extraction network connected to a cell classification head, a motion prediction head, and a current motion state estimation head jointly trained with each other; and
producing a motion trajectory of the vehicle using the extended BEV image; and controlling an actuator of the vehicle based on the motion trajectory.

14. The method of claim 13, wherein the pixel in the set of pixels is classified with a label of the object occupying a location corresponding to a position of the pixel in the extended BEV image at a current time step.

* * * * *